United States Patent
Ishii

(10) Patent No.: US 10,068,073 B2
(45) Date of Patent: Sep. 4, 2018

(54) VERIFICATION DEVICE AND CONTROL METHOD FOR VERIFICTION DEVICE, AS WELL AS COMPUTER PROGRAM

(71) Applicant: NEC Corporation, Minato-ku, Tokyo (JP)

(72) Inventor: Masato Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/415,324

(22) PCT Filed: Jul. 3, 2013

(86) PCT No.: PCT/JP2013/004122
§ 371 (c)(1),
(2) Date: Jan. 16, 2015

(87) PCT Pub. No.: WO2014/013686
PCT Pub. Date: Jan. 23, 2014

(65) Prior Publication Data
US 2015/0186629 A1    Jul. 2, 2015

(30) Foreign Application Priority Data
Jul. 19, 2012   (JP) ................................ 2012-160418

(51) Int. Cl.
*G06F 21/00* (2013.01)
*G06F 21/31* (2013.01)
*G06K 9/00* (2006.01)

(52) U.S. Cl.
CPC ......... *G06F 21/31* (2013.01); *G06K 9/00221* (2013.01)

(58) Field of Classification Search
None
See application file for complete search history.

(56) References Cited

U.S. PATENT DOCUMENTS

2005/0264840 A1* 12/2005 Niitsuma .................. 358/1.14
2006/0120589 A1    6/2006 Hamanaka
(Continued)

FOREIGN PATENT DOCUMENTS

JP    H05-101186 A    4/1993
JP    2000-298496 A    10/2000
(Continued)

OTHER PUBLICATIONS

International Search Report for PCT Application No. PCT/JP2013/004122, dated Sep. 10, 2013.
(Continued)

*Primary Examiner* — David Le

(57) ABSTRACT

Disclosed is a verification device and the like that suppress an erroneous determination upon determining a difference between input patterns based on a similarity to a reference pattern recorded under a specific condition. A verification device 100 includes a similarity calculation unit 6 calculating similarities S 7 between a set of input information x 110 and y 111 indicating features related to input patterns that are objects of verification and a plurality of types of reference information 112 indicating features related to a reference pattern to be a reference of the verification by using the set of input information x 110 and y 111 and the plurality of types of reference information 112. The calculated similarities S7 are presented to an external device or a user.

8 Claims, 8 Drawing Sheets

(56) References Cited

U.S. PATENT DOCUMENTS

| | | | | |
|---|---|---|---|---|
| 2008/0104676 A1* | 5/2008 | Ikegami | ............ | G07C 9/00158 |
| | | | | 726/4 |
| 2010/0007763 A1 | 1/2010 | Yokohata | | |
| 2010/0034432 A1* | 2/2010 | Ono et al. | ................ | 382/118 |
| 2014/0002238 A1* | 1/2014 | Taveau | ............ | G07C 9/00087 |
| | | | | 340/5.53 |

FOREIGN PATENT DOCUMENTS

| JP | 2001-014465 A | 1/2001 |
|---|---|---|
| JP | 2004-78686 A | 3/2004 |
| JP | 2006-331091 A | 12/2006 |
| JP | 2007-052733 A | 3/2007 |
| JP | 2008-59533 A | 3/2008 |
| JP | 2009-211178 A | 9/2009 |
| JP | 2010-021943 A | 1/2010 |
| JP | 2010-231744 A | 10/2010 |
| JP | 4560832 B2 | 10/2010 |
| JP | 4775515 B1 | 9/2011 |
| JP | 2011-221812 A | 11/2011 |
| WO | 2004/008392 A1 | 1/2004 |

OTHER PUBLICATIONS

Hiroshi Kage et al., "Performance estimation of face authentication based on auto-associative memory",The Institute of Electronics, Information and Communication Engineers, Jun. 2006, vol. 106, No. 102, pp. 47-52 English Abstract.

Japanese Office Action for JP Application No. 2014-525706 dated Aug. 1, 2017 with English Translation.

Japanese Office Action for JP Application No. 2014-525706 dated May 23, 2017 with English Translation.

* cited by examiner

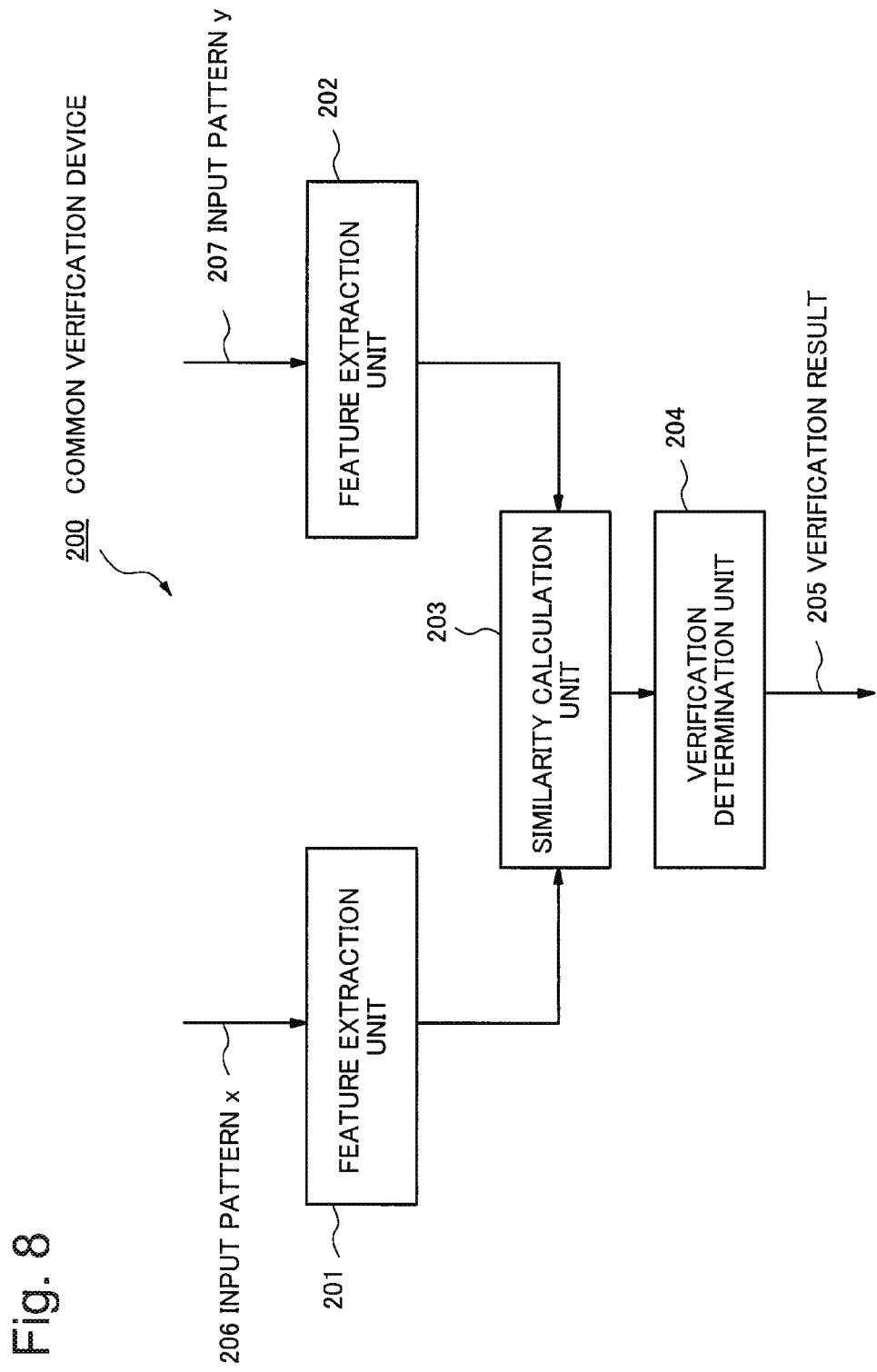

VERIFICATION DEVICE AND CONTROL METHOD FOR VERIFICTION DEVICE, AS WELL AS COMPUTER PROGRAM

This application is a National Stage Entry of PCT/JP2013/004122 filed on Jul. 3, 2013, which claims priority from Japanese Patent Application 2012-160418 filed on Jul. 19, 2012, the contents of all of which are incorporated herein by reference, in their entirety.

TECHNICAL FIELD

The present invention relates to a technical field such as a verification device and the like that verifies input patterns.

BACKGROUND ART

Over recent years, for example, to achieve safety in public places and facilities such as airports and the like and to ensure information security and the like upon logging into an information processing system and the like, pattern verification for confirming a person, for example, using biological information is performed.

The biological information refers to a physical feature such as a face, a fingerprint, and the like. The pattern refers to image data of a face, a fingerprint, and the like.

In other words, in pattern verification, for example, a face image or a fingerprint image is input as a pattern and then the pattern is determined whether to be the same as a pattern of an image previously registered.

In general, such a technique for verifying patterns calculates a similarity indicating to what extent features in two input patterns are similar and compares the similarity with a predetermined threshold for verification determination.

FIG. 8 illustrates a configuration example of such a method. FIG. 8 is a block diagram illustrating a function in a common verification device 200.

The common verification device 200 illustrated in FIG. 8 includes a feature extraction unit 201 and a feature extraction unit 202 extracting features related to two input patterns. The verification device 200 includes a similarity calculation unit 203 calculating a similarity between the features extracted in the feature extraction units 201 and 202 and a verification determination unit 204 verifying the two input patterns based on the calculated similarity.

When an input pattern x 206 and an input pattern y 207 are input, the common verification device 200 illustrated in FIG. 8 extracts features of respective patterns in the feature extraction units 201 and 202.

The common verification device 200 calculates similarities in the respective features extracted from the input pattern x 206 and the input pattern y 207 in the similarity calculation unit 203. The verification device 200 determines a similarity degree between the input patterns in the verification determination unit 204 based on the similarities calculated in the similarity calculation unit 203 to output a verification result 205.

In such a common verification device, a method how to calculate similarities from features in input patterns affects verification performance (i.e., verification accuracy upon verification, and time and cost necessary upon verification) to a large extent.

Over recent years, as one of methods commonly used, there is known a method for calculating a similarity between input patterns based on a distance between feature vectors extracted from the input patterns. Such a method performs a determination as the same pattern when a calculated similarity is higher than a predetermined threshold (i.e., a distance between feature vectors is small), and performs a determination as different patterns when the similarity is lower than the predetermined threshold (i.e., the distance between the feature vectors is long), for example.

The feature vector represents a set of numerical values obtained by quantifying and arranging features in an input pattern according to feature amounts thereof. The distance between feature vectors represents a distance in sets of numerical values in a feature space.

One of problems making such pattern verification difficult lies in changes in a photographic condition between input patters. An ideal target is that, for example, upon performing face verification, when a reference pattern is a person's own pattern, a high similarity is obtained due to a similar face image, and when the reference pattern is another person's pattern, a low similarity is obtained due to a different face image.

However, actually, upon inputting patterns, when face postures or photographic conditions (photographic environments) such as lighting and the like are different between face images to be input, similarity decreases due to images different in appearance (i.e., feature vectors are different) even when a reference pattern is a person's own pattern, resulting in a problem in which the person him-/her-self is falsely determined as another person.

The above problem results from direct use of a similarity between input patterns for verification determination. Therefore, a method for using a plurality of similarities between those other than input patterns in addition to a similarity between the input patterns has been proposed. As such a method, Zero Normalization (hereinafter, abbreviated as "Z-norm") is widely known. FIG. 6 illustrates a configuration example of this method.

FIG. 6 is a block diagram illustrating a function in a common verification device 300 using a Z-norm method.

The common verification device 300 using a Z-norm method illustrated in FIG. 6 includes an input pattern x 307, a verification pattern storage unit 301, a feature extraction unit 302, a similarity calculation unit 303, a similarities integration unit 304, and a verification determination unit 305.

The verification pattern storage unit 301 in such a common verification device 300 stores a plurality of verification patterns (i.e., corresponding to the above reference pattern, and hereinafter, being the same in description regarding the present common example). The feature extraction unit 302 extracts a feature of the input pattern x 307 and features of several verification patterns picked up from the verification pattern storage unit 301.

The similarity calculation unit 303 in the common verification device 300 calculates similarities in the extracted features. The similarities integration unit 304 compares the calculated similarities. The verification determination unit 305 determines similarity degrees of the compared results to perform verification.

When the input pattern x 307 intended to be verified is input, the common verification device 300 using a Z-norm method illustrated in FIG. 6 picks up several ones from a plurality of verification patterns stored on the verification pattern storage unit 301 and extracts respective features together with the input pattern x 307 in the feature extraction unit 302.

The common verification device 300 calculates respective similarities in the features of the verification patterns with respect to a certain feature of the input pattern in the similarity calculation unit 303 and compares similarities in the verification patterns with respect to the input pattern over the several verification patterns picked up in the similarities integration unit 304. The verification device 300 outputs a verification result 306 by determining similarity degrees in the verification determination unit 305 based on the comparison result.

In the Z-norm method, distribution of similarities between each of verification patterns to be references upon verification registered in a data base (corresponding to the verification pattern storage unit 301 in FIG. 6) and an input pattern intended to be verified is normalized into a normal distribution to perform a similarity correction.

Thereby, even when, for example, a similarity between person's own face images decreases due to a difference in photographic condition in input patterns, a distribution of similarities to another person also decreases totally in the same manner and therefore, a correction using Z-norm achieves similarity enhancement and then false verification is unlikely to occur.

PTL 1 to PTL 3 employ a method for correcting the same similarity between input patterns as in Z-norm using similarities to a plurality of other patterns registered.

On the other hand, in PTL 4, a plurality of three-dimensional models are previously prepared; an image (hereinafter, referred to as a "comparative pattern" in description regarding the present common example) in a posture close to an input pattern and a lighting condition is generated for each model; and a similarity between an input pattern and a comparative pattern is used as a feature amount to perform a verification.

Such a method uses no similarity between input patterns and therefore, is independent of photographic conditions upon photographing the input patterns. However, the method has a problem in which it is necessary to estimate a photographic condition of the input pattern to generate the comparative pattern.

FIG. 7 illustrates a configuration example in this method. FIG. 7 is a block diagram illustrating a function in a common verification device 400 using a comparative pattern generation unit.

The common verification device 400 using a comparative pattern generation unit illustrated in FIG. 7 includes an input pattern x 410 and an input pattern y 411, a model storage unit 401, a comparative pattern generation unit 402 and a comparative pattern generation unit 403, a feature extraction unit 404 and a feature extraction unit 405, a similarity calculation unit 406 and a similarity calculation unit 407, and a verification determination unit 408.

The model storage unit 401 in the common verification device 400 using a comparative pattern generation unit illustrated in FIG. 7 stores models to be bases of comparative patterns to be generated. The comparative pattern generation unit 402 and the comparative pattern generation unit 403 generate comparative patterns by estimating the comparative patterns on the basis of the models. The feature extraction unit 404 and the feature extraction unit 405 extract respective features related to the input patterns and the comparative patterns.

The similarity calculation unit 406 and the similarity calculation unit 407 in such a common verification device 400 calculate similarities in features extracted in the feature extraction units 404 and 405, respectively. The verification determination unit 408 compares similarity degrees of the similarities calculated in the similarity calculation unit 406 and the similarity calculation unit 407.

When the input pattern x 410 and the input pattern y 411 are input, the common verification device 400 using a comparative pattern generation unit illustrated in FIG. 7 generates comparative patterns in the comparative pattern generation units 402 and 403 on the basis of the models that are bases of the comparative patterns stored on the model storage unit 401.

The comparative patterns generated in the comparative pattern generation units 402 and 403 are input to the feature extraction units 404 and 405 together with the input pattern x 410 and the input pattern y 411, respectively, to extract respective features.

The common verification device 400 using a comparative pattern generation unit calculates respective similarities to the comparative patterns for the two input patterns in the similarity calculation units 406 and 407 and determines similarity degrees in the verification determination unit 408 based on the calculated similarities to output a verification result 409.

CITATION LIST

Patent Literature

[PTL 1] Japanese Patent No. 4775515
[PTL 2] Japanese Laid-open Patent Publication No. 2008-59533
[PTL 3] Japanese Laid-open Patent Publication No. 2004-78686
[PTL 4] Japanese Patent No. 4560832

SUMMARY OF INVENTION

Technical Problem

There are the following problems in the above common verification devices.

A first problem is that since photographic conditions are different between input patterns input, a similarity decreases even for a person him-/her-self or a similarity increases even for another person.

The reason is that a similarity between input patterns is used upon verification. In PTL 1 to PTL 3, various features in input patterns that are objects of verification and a verification pattern are used and then a similarity in the verification pattern with respect to the input patterns is calculated.

Therefore, since a similarity also between input patterns is used for verification determination, the problem is reduced but is not inherently solved.

A second problem is that, for example, as seen in PTL 4, to measure a similarity to an input pattern, when a person's own comparative pattern is generated, a correct comparative pattern is not always generated and therefore, it is difficult to calculate a similarity effective for verification determination in some cases.

The reason is that in generation of a comparative pattern, it is necessary to estimate a posture and a lighting condition of an input pattern, and when there is an error in this estimation, no correct comparative pattern is generated and the error is propagated up to calculation of a similarity that is the following processing.

Accordingly, a main object of the present invention is to provide a verification device and the like that suppresses an erroneous determination upon determining a difference between input patterns based on similarity to a reference pattern recorded under a specific condition.

Solution to Problem

To achieve the object, a verification device according to the present invention includes the following constitution.

In other words, the verification device according to the present invention includes:

a similarity calculation unit that calculates similarities between a set of input information indicating features related to input patterns that are objects of verification and a plurality of types of reference information indicating features related to a reference pattern to be a reference of the verification using the set of input information and the plurality of types of reference information.

As another aspect of the present invention, a control method for the verification device according to the present invention calculates, in a similarity calculation function, similarities between a set of input information indicating features related to input patterns that are objects of verification and a plurality of types of reference information indicating features related to a reference pattern to be a reference of the verification using the set of input information and the plurality of types of reference information.

The same object is also achieved by a computer program achieving the control method for the verification device as another aspect using a computer and a computer-readable, non-volatile storage medium stored with the computer program.

The same object is also achieved by a verification processing system in which when the respective processing units in the verification device exist communicably to each other via, for example, a communication network, verification processing is executed as a system integrating these units.

Advantageous Effects of Invention

The verification device and the like according to the present invention makes it possible to suppress an erroneous determination upon determining a difference between input patterns based on similarity to a reference pattern recorded under a specific condition.

BRIEF DESCRIPTION OF DRAWINGS

FIG. 8 is a block diagram illustrating a function in a common verification device.

DESCRIPTION OF EMBODIMENTS

Next, preferred exemplary embodiments for carrying out the invention will be described in detail with reference to the drawings.

First Exemplary Embodiment

Figure 1:
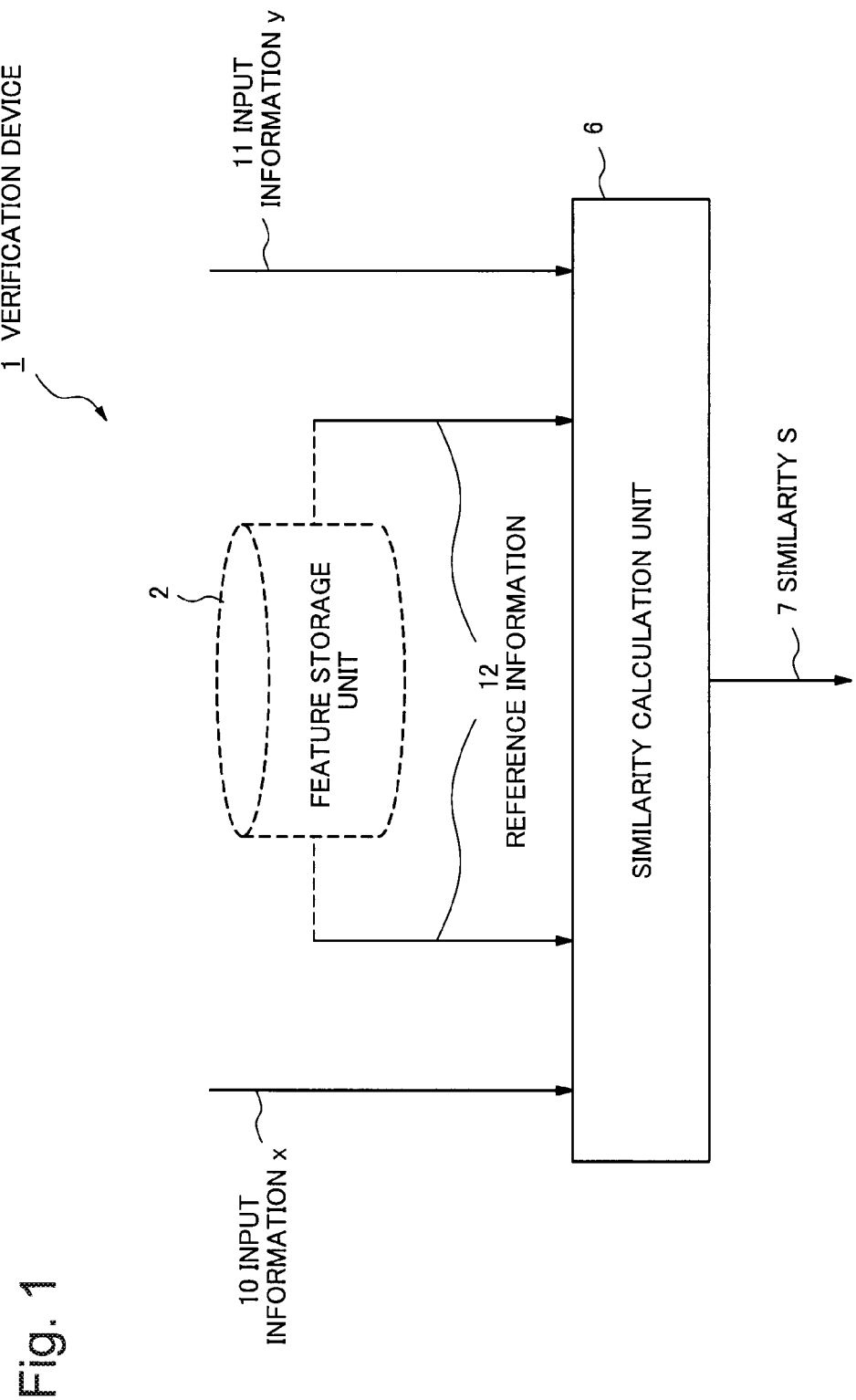
FIG. 1 is a block diagram conceptually illustrating a function of a verification device according to a first exemplary embodiment of the present invention.

A configuration and an operation of a verification device 1 according to a first exemplary embodiment of the present invention will be described in detail with reference to FIG. 1. FIG. 1 is a block diagram conceptually illustrating a function of the verification device 1 according to the first exemplary embodiment of the present invention.

Referring to FIG. 1, the present verification device 1 includes a similarity calculation unit 6. The present verification device 1 calculates respective similarities S7 representing similarities between a set of input information and a plurality of types of reference information 12 in the similarity calculation unit 6, using an input information x 10 and an input information y 11 that are a set of input information where features related to input patterns that are objects of verification are extracted and a reference information 12 where features related to a reference pattern to be a reference of the verification are extracted.

In the present verification device 1, a plurality of reference information 12 stored on the feature storage unit 2 are information where, for example, features related to an individual reference pattern based on a specific condition (an environment, being the same in description relevant to the present exemplary embodiment) able to be a reference upon such a verification are extracted.

A feature related to a pattern refers to, for example, a feature amount or a feature vector indicating a specific feature possessed by the pattern.

A plurality of reference information 12 stored on the feature storage unit 2 may be matched with at least one of the input information x 10 or the input information y 11 in some cases. The reference information 12 stored on the feature storage unit 2 may be stored as the same pattern in some cases.

In the present exemplary embodiment, the similarity S7 is interpretable as information (i.e., information representing a similarity degree) representing a scale indicating to what extent each of the input information x 10 and the input information y 11 and the same reference information 12 are similar, the scale being calculated, for example, based on a calculated value statistically determined, regarding a set of input information and an individual reference information 12 among a plurality of reference information 12 picked up from the feature storage unit 2 (as one example, as the similarity S7, there can be cited information indicating each of logical distances in a space representing features between the input information x 10 and y 11 and the reference information 12 where features thereof are extracted).

A unit number upon picking up, at a time, a plurality of reference information 12 stored on the feature storage unit 2 are determined by the number of similarities S7 able to be handled in such a method that, for example, from a plurality of reference information 12 picked up at a time, the reference information 12 are further picked up one by one and similarities S7 are calculated in order.

As the picking-up method of a plurality of reference information 12 from the feature storage unit 2, it is possible that, for example, the plurality of units (a predetermined number) are picked up at a time and from the plurality of reference information 12 picked up, the reference information 12 are further picked up one by one at random. However, the number and the picking-up method upon picking up the reference information 12 from the feature storage unit 2 are not limited to the methods as described above.

It is possible to appropriately determine the number of repetition times of picking up, at a time, a plurality of reference information 12 stored on the feature storage unit 2, according to a balance among desired verification accuracy, the number (i.e., an upper limit number) of a plurality of reference information 12 stored on the feature storage unit 2, and a processing time for verifying the input information x 10 and the input information y 11 that are a set of input information.

The similarity calculation unit 6 can output a plurality of calculated similarities S7 and also present the similarities S7 to an external device or a user, for example, using a presentation unit, not illustrated, included in the similarity calculation unit 6.

This makes it possible that, for example, the external device or the user understands to what extent the input information x 10 and y 11 each are similar to which one of a plurality of reference information 12 picked up.

In other words, according to the verification device 1 according to the present exemplary embodiment, it is possible to estimate whether the input information x 10 and y 11 are the same based on the similarities S7 obtained by calculation.

The reason is that magnitude relations are discriminable from numerical values (information) of similarities obtained by calculating between each of the input information x 10 and y 11 and a common reference information 12.

Even when the input information x 10 and y 11 are information acquired under different conditions from each other, a comparison is performed between each of the input information x 10 and y 11 and the same reference information 12, as a reference, stored (acquired) under a specific condition and therefore, on the basis of relative differences between obtained similarities S7, similarity magnitudes can be determined. In other words, the similarities S7 are independent of acquisition conditions upon acquisition of the input information x 10 and y 11.

Regarding the similarities S7, similarities S7 are examined over the number of a plurality of reference information 12 picked up and also this operation is repeated at a plural (predetermined) number of times and thereby, the similarities S7 and a magnitude relation between the similarities S7 are determined as certain numerical values.

This makes it possible that, for example, an external device or a user determines whether the input information x 10 and y 11 acquired under different conditions are similar.

The reason is that as described above, on the basis of the same reference information 12 stored (acquired) under a specific condition, similarities S7 are compared.

The input patterns and the reference pattern each are an image representing a person or an object as one example.

In other words, the verification device 1 according to the present exemplary embodiment makes it possible to suppress an erroneous determination upon determining a difference between input patterns based on similarity to a reference pattern recorded under a specific condition.

Second Exemplary Embodiment

Figure 2:
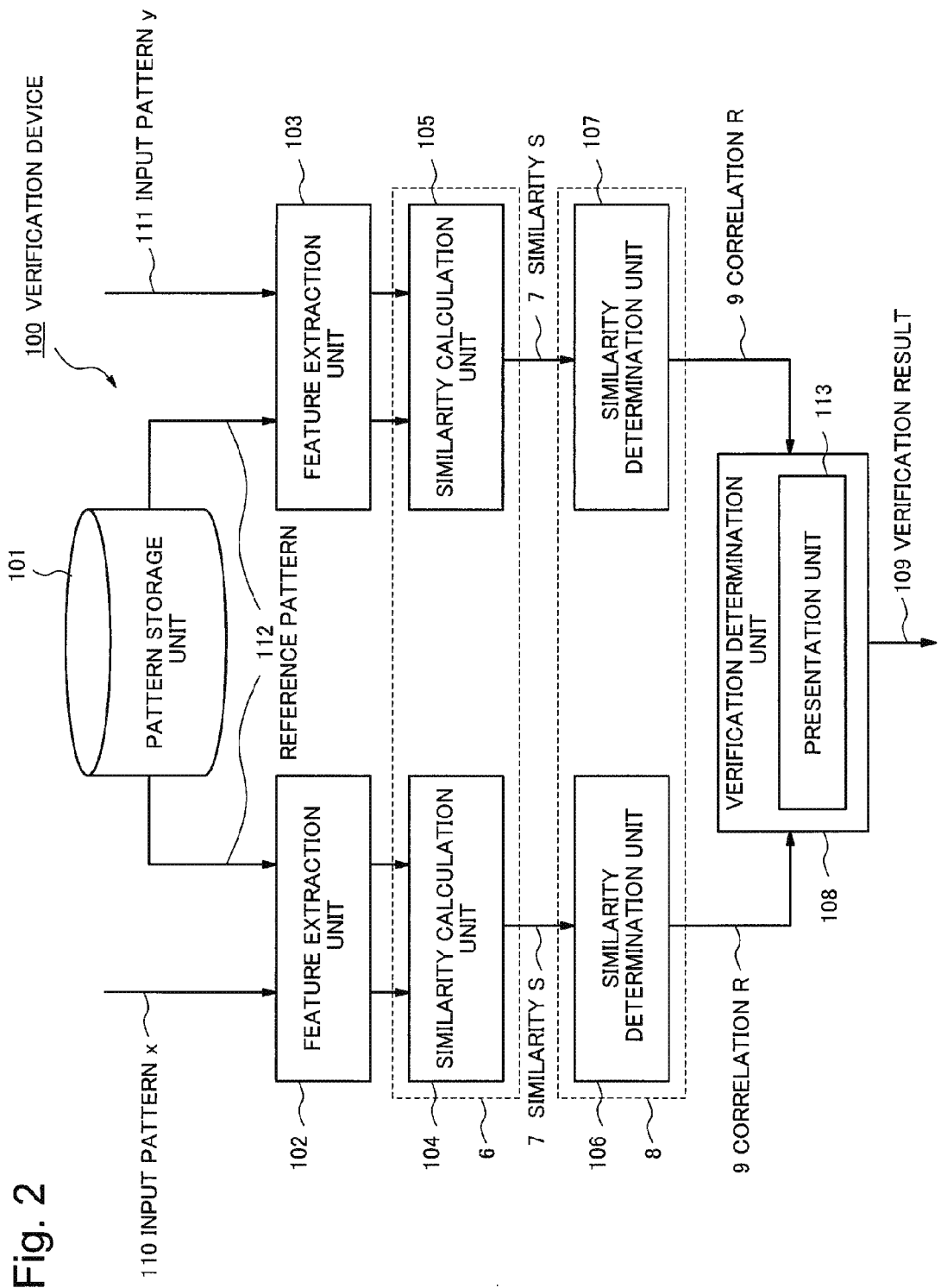
FIG. 2 is a block diagram conceptually illustrating a function of a verification device according to a second exemplary embodiment of the present invention.

A configuration of a verification device 100 according to a second exemplary embodiment of the present invention will be described in detail with reference to FIG. 2. FIG. 2 is a block diagram conceptually illustrating a function of the verification device 100 according to the second exemplary embodiment of the present invention.

The verification device 100 according to the present exemplary embodiment includes an input pattern x 110 and an input pattern y 111, a pattern storage unit 101, a reference pattern 112, feature extraction units 102 and 103, similarity calculation units 104 and 105, similarity determination units 106 and 107, and a verification determination unit 108.

The first exemplary embodiment has been described using two input information x 10 and y 11 where features related to input patterns illustrated in FIG. 1 are extracted and a plurality of reference information 12 where features related to a reference pattern are extracted and stored on the feature storage unit 2.

The present exemplary embodiment differs in a respect in which two input patterns illustrated in FIG. 2, i.e., the input pattern x 110 and the input pattern y 111 and the reference pattern 112 picked up from the pattern storage unit 101 are used.

The similarity calculation unit 6 illustrated in the first exemplary embodiment corresponds to the similarity calculation units 104 and 105 in the present exemplary embodiment. Therefore, when being collectively referred to, the similarity calculation units 104 and 105 may be referred to as the similarity calculation unit 6.

In the following description, characteristic matters according to the present exemplary embodiment are mainly described, and overlapping description of the same configurations as in the first exemplary embodiment is omitted.

Referring to FIG. 2, the verification device 100 according to the present exemplary embodiment includes two different input patterns, i.e., the input pattern x 110 and the input pattern y 111.

The pattern refers to an image representing, for example, a person or an object, and, in other words, the input patterns and the reference pattern refer to input images that are objects of verification and a reference image to be a reference of the verification, respectively.

The verification device 100 includes the pattern storage unit 101 storing a plurality of reference patterns 112 photographed under a specific photographic condition and being capable of picking up a predetermined number of reference patterns at a time.

The verification device 100 includes the feature extraction unit 102 extracting features each in the input pattern x 110 and the reference pattern 112 extracted from the pattern storage unit 101 and the feature extraction unit 103 extracting features each in the input pattern y 111 and the reference pattern 112 extracted from the pattern storage unit 101.

When being collectively referred to, the input pattern x 110 and the input pattern y 111 may be referred to as two input patterns.

It is assumed that as a plurality of reference patterns 112 picked up from the pattern storage unit 101 at a time, the same (i.e., a common) pattern is extracted for two input patterns each. It is assumed that regarding the reference pattern 112 picked up from the pattern storage unit 101, a predetermined number of reference patterns 112 each are randomly picked up from a plurality of reference patterns 112 at a time.

The predetermined number upon picking up the reference patterns 112 at a time refers to, for example, two or a multiple number. In other words, the predetermined number refers to a number serving as a unit upon executing processing while the reference pattern 112 is changed one by one from a predetermined number of reference patterns picked up at a time when feature extraction processing or similarity calculation processing is executed in the feature extraction units 102 and 103 or the similarity calculation units 104 and 105 to be described later, respectively, for example.

As an example of the input pattern, for example, in face verification, the input pattern x 110 that is a face image detected from a monitoring image via a camera or the like and the input pattern y 111 that is a face image, for example, listed in an important person list are designated as inputs. The two input patterns result in different input patterns under different photographic conditions even when, for example, the same person is treated on both the x side and the y side.

The reference pattern 112 photographed under a specific photographic condition is different in pattern and photographic condition from the two input patterns. For a plurality of reference patterns 112 stored on the pattern storage unit 101, no identical pattern is included.

However, the reference pattern 112 may be the same as any one of the two input patterns. The same reference pattern may be stored for the reference patterns 112 stored on the pattern storage unit 101.

The verification device 100 according to the present exemplary embodiment includes the similarity calculation units 104 and 105 calculating respective similarities S7 between features of two input feature information (not illustrated, hereinafter the same) in two input patterns extracted in the feature extraction units 102 and 103, respectively, and a reference feature information (not illustrated, hereinafter the same) extracted from a predetermined number of reference patterns 112 when the two input patterns are input.

It is possible that the feature extraction units 102 and 103 are operated to pick up two input patterns and the reference pattern 112 without limitation to the example where processing is executed in response to the inputs of the two input patterns.

The verification device 100 according to the present exemplary embodiment includes the similarity determination units 106 and 107 determining to what extent two input feature information are similar to which one of a predetermined number of reference feature information based on the respective similarities S7 calculated in the similarity calculation units 104 and 105, as similarity degrees, i.e., the correlations R9 representing, for example, magnitude relations in the similarities S7.

When being collectively referred to, the similarity determination units 106 and 107 may be referred to as the similarity determination unit 8.

The extracted feature refers to a feature vector indicating a feature (i.e., a set of numerical values where a feature of an input pattern is quantified and arranged according to the feature (a feature amount)).

The calculated similarity refers to a numerical value representing a similarity degree indicating to what extent an input feature information and a reference feature information are similar between statistically determined feature vectors.

The verification device 100 according to the present exemplary embodiment may present, to an external device, a user, or the like, for example, respective similarities S7 calculated in the similarity calculation units 104 and 105 during verification at a certain picking-up time, using a presentation unit, not illustrated, included in the similarity calculation unit 6.

The similarity determination units 106 and 107 determine correlations indicating to what extent the two input feature information are similar to which one of a predetermined number of reference feature information picked up based on the calculated similarities S7 in the similarity calculation units 104 and 105, respectively, by comparing, for example, magnitude relations in the similarities S7.

The verification device 100 according to the present exemplary embodiment inputs the determination results from the similarity determination units 106 and 107 to the verification determination unit 108 from the input pattern x 110 side and the input pattern 111 side, respectively.

The verification device 100 according to the present exemplary embodiment may present, to an external device, a user, or the like, for example, correlations R9 in similarities S7 determined in the similarity determination units 106 and 107 during verification at a certain picking-up time, using a presentation unit, not illustrated, included in the similarity determination unit 8.

The verification determination unit 108 outputs, as a verification result 109, a result obtained by examining a rate indicating in how many numbers among the predetermined number of reference patterns 112 picked up the two correlations R9 from the x side and the y side are matched, using a predetermined threshold.

The verification device 100 according to the present exemplary embodiment picks up again the predetermined number of reference patterns from the pattern storage unit 101 at a time and repeats the operation for verifying the two input patterns. The number of repetition times may be appropriately determined according to a balance among desired verification accuracy, the number (i.e., an upper limit number) of reference patterns 112 stored on the pattern storage unit 101, and a processing time for verifying two input patterns.

A presentation unit 113 included in the verification determination unit 108 can present the final verification result 109 to a user, for example, by displaying the result on a display or the like as described later.

The presentation unit 113 included in the verification determination unit 108 may perform a presentation, for example, by including the similarities S7 in the similarity calculation unit 6 during verification at a certain picking-up time and the correlations R9 in the similarity determination unit 8.

At that time, to issue an alert to the user, it is possible to issue a notification as follows, for example, by:
  changing a display content of the verification result 109 displayed on a display or the like,
  generating a sound such as a buzzer and the like (not illustrated),
  generating a voice such as a voice message and the like voice-synthesized or recorded,
  lighting or blinking a light such as a lamp and the like (not illustrated),
  generating a vibration (not illustrated) sensible to a user,
  issuing a notification to another information processing device via a communicable communication network (not illustrated) as described later, or a combination thereof.

Subsequently, an operation in the second exemplary embodiment will be described in more detail with reference to FIG. 2. Initially, the input pattern x 110 and the input pattern y 111 are input to the feature extraction units 102 and 103, respectively. Alternatively, the feature extraction units 102 and 103 are operated to pick up two input patterns.

In response thereto, a predetermined number of the same reference patterns 112 picked up from the pattern storage unit 101 are output to each of the feature extraction units 102 and 103. Alternatively, the feature extraction units 102 and 103 are operated to pick up the reference patterns 112 from the pattern storage unit 101.

The feature extraction units 102 and 103 extract respective features of the two input patterns and the reference patterns input.

At that time, one each of the predetermined number of reference patterns input to the feature extraction units 102 and 103 is selected at a time and then features are extracted in selection order of the reference patterns.

The feature extraction units 102 and 103 output the extracted features, i.e., two input feature information and a reference feature information to the similarity calculation units 104 and 105, respectively.

The similarity calculation units 104 and 105 calculate similarities S7 between features in the input feature information and the reference feature information extracted in the feature extraction units 102 and 103 and then output the calculated similarities S7 to the similarity determination units 106 and 107, respectively.

At that time, the similarity calculation units 104 and 105 each calculate the similarity S7 to one corresponding input feature information over the predetermined number of reference patterns while the reference feature information are changed one by one based on an order upon picking up one reference pattern 112 at a time from the predetermined number of reference patterns picked up from the pattern storage unit 101 with respect to the input pattern. This operation is executed on each of the x side and the y side.

The similarity determination units 106 and 107 determine the correlations R9 indicating, for example, magnitude relations in the similarities S7 based on the similarities S7 between features that are outputs from the similarity calculation units 104 and 105, and output the determination result to the verification determination unit 108 according to an order where, for example, the similarities S7 are input from the similarity calculation units 104 and 105 to the similarity determination units 106 and 107, respectively.

At that time, the similarity determination units 106 and 107 each determine a similarity degree over the predetermined number of reference patterns picked up, while similarities are changed one by one in order of outputs from the similarity calculation units 104 and 105. This operation is executed on each of the x side and the y side.

In the determination in the similarity determination units 106 and 107, it is possible that, for example, on the basis of a magnitude relation in numerical values representing the similarities S7, the similarities S7 are arranged in association with an order upon changing the reference feature information one by one. Alternatively, in the determination in the similarity determination units 106 and 107, the similarity S7 of a reference pattern having the largest similarity S7 may be output in association with an order upon changing the reference feature information one by one.

However, a determination method in the determination in the similarity determination units 106 and 107 and an output form such as an association with a picking-up order in reference patterns and the like are not limited.

The verification determination unit 108 determines a ratio of number where how many reference patterns are matched among the predetermined number of reference patterns 112 picked up at a time on the input pattern x 110 side and the input pattern y 111 side using a predetermined threshold previously set after an appropriate number of repetition times of processing accompanied with the above picking-up, based on the determination results in the correlations R9 output by the similarity determination units 106 and 107 to obtain a verification result 109.

At that time, the presentation unit 113 included in the verification determination unit 108 may present the verification result 109 to a user using a display or the like as described later.

In other words, a determination to which one of the predetermined number of reference patterns picked up a coincidence is established to what extent is performed by the following steps. While one reference pattern to be compared with input patterns is changed at a time from the predetermined number of reference patterns 112 picked up, the number of times (the number of patterns) where similarity determination results (i.e., results obtained by determining a magnitude of the correlation R9 that is, for example, a magnitude relation in the similarities S7 using a threshold) are matched on the x side and the y side of the input patterns is examined. When, for example, the number of times of the coincidence (the number of patterns) is larger than a predetermined threshold, the input pattern x 110 side and the input pattern y 111 side are determined to be the same and then a verification result 109 indicating sameness is obtained.

At that time, a set value set as the predetermined threshold is, for example, a majority of a predetermined number that is the number of patterns upon picking up the reference patterns 112. However, the predetermined threshold is not limited to this value.

The repetition of the processing correlated with picking-up at an appropriate number of times means that the following steps are performed. A predetermined number of reference patterns 112 are picked up, features are extracted, similarities S7 are calculated, correlations R9 are determined, and verification is performed on the x side and the y side of input patterns based on the correlations R9. Each operation described above is repeated at a number of times determined according to a balance among desired verification accuracy, an upper limit number of reference patterns 112 in the pattern storage unit 101, and a processing time for verification.

Regarding the configuration and the operation in the present exemplary embodiment described using FIG. 2, a control method therefor will be described in detail below with reference to FIG. 3.

Figure 3:
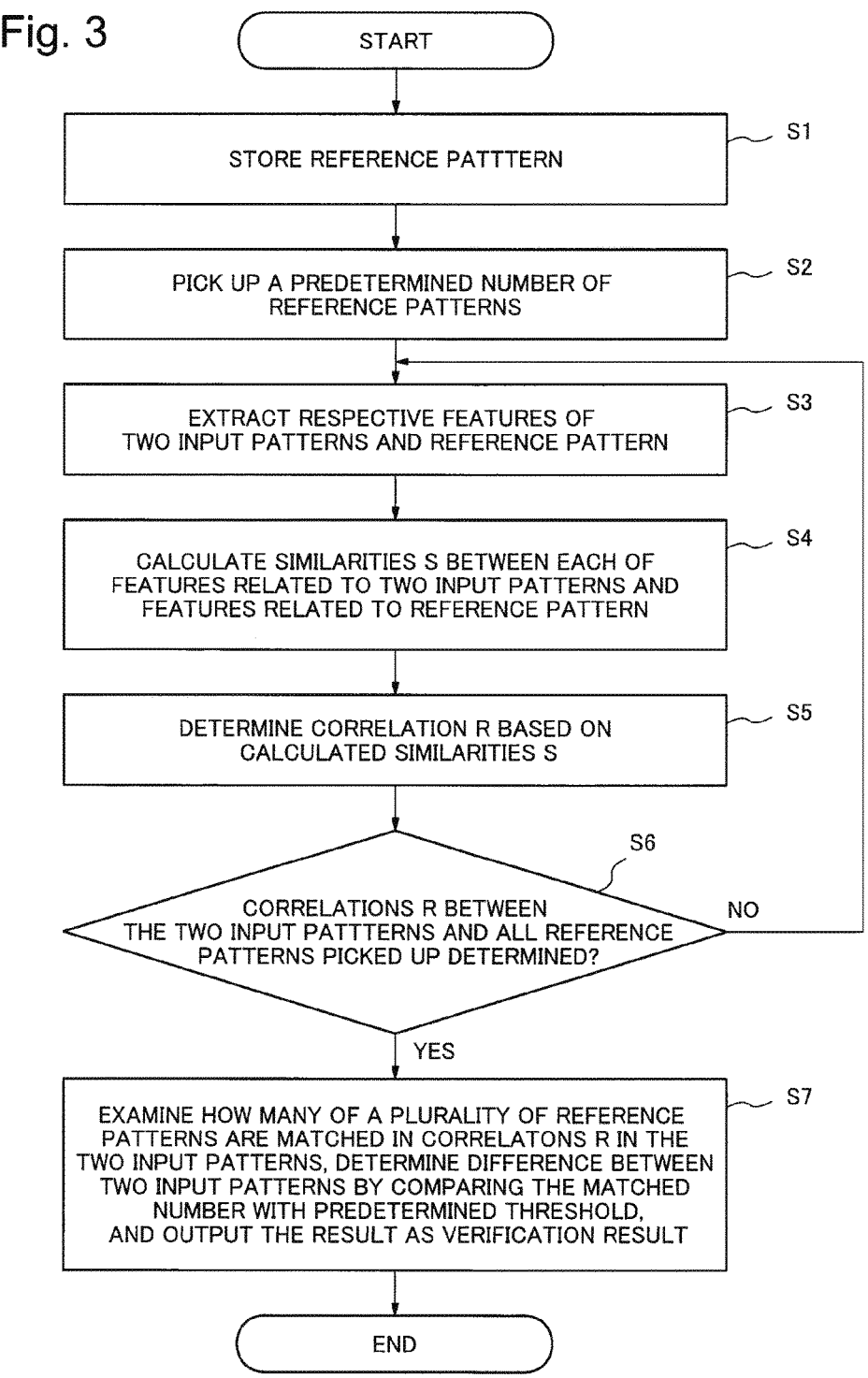
FIG. 3 is a flowchart illustrating a control method for the verification device according to the second exemplary embodiment of the present invention.

FIG. 3 is a flowchart illustrating a control method for the verification device 100 in the present exemplary embodiment.

Initially, the pattern storage unit 101 stores the reference pattern 112 (step S1).

It is possible that a plurality of reference patterns 112 are previously photographed in a different location having a specific photographic condition and stored on the pattern storage unit 101.

At that time, only step S1 is executed.

The pattern storage unit 101 picks up a predetermined number of reference patterns 112 (step S2).

The number upon picking up the reference patterns 112 from the pattern storage unit 101 is, for example, 2 or a multiple number previously determined. As a picking-up method upon picking up the reference pattern 112 from the pattern storage unit 101, the above predetermined number of reference patterns may be randomly picked up at a time. Alternatively, it is possible that while, for example, the predetermined number of reference patterns picked up at a time are changed one by one at random, the reference patterns are output to the feature extraction units 102 and 103.

The feature extraction units 102 and 103 extract respective features related to the input pattern x 110 and the input pattern y 111 as well as the reference patterns 112 (step S3).

Regarding the two input patterns, patterns photographed under an optional photographic condition are input to the feature extraction units 102 and 103.

When one input pattern is input on each of the x side and the y side, the same reference pattern 112 is successively output to the feature extraction units 102 and 103 at the same time.

As a method for extracting features from the two input patterns and the reference pattern in the feature extraction units 102 and 103, any method is employable when being a feature extraction method capable of extracting a feature vector such that the similarity S7 is measurable based on a calculated value statistically determined, for example.

The similarity calculation units 104 and 105 calculate the similarities S7 between each of features extracted from the input pattern x 110 and the input pattern y 111 and the feature extracted from the reference pattern 112 (step S4).

The similarity determination units 106 and 107 determine the correlations R9 based on the similarities S7 determined in the similarity calculation unit 6 (step S5).

For the determination to what extent the two input patterns and the reference pattern in the similarity determination units 106 and 107 are similar, any method is employable when the correlations R9 indicating magnitude relations in the similarities S7 are measurable. As one example, it is possible to determine magnitude relations based on distances in feature vectors that are features extracted from two input patterns and a reference pattern.

The present verification device 100 may present, for example, the similarities S7 and the correlations R9 at a certain picking-up time to a user using a display or the like as described later.

In this case, for example, the similarity calculation unit 6 and the similarity determination unit 8 include a presentation unit (not illustrated) and output the similarities S7 and the correlations R9, respectively, using the presentation unit. Alternatively, the similarity determination unit 8 may output collectively the similarities S7 and the correlations R9.

The similarity determination units 106 and 107 examine whether the correlations R9 between the two input patterns and all the reference patterns 112 picked up have been determined (step S6).

Until none of the reference patterns 112 picked up exists, step S3 to step S6 are repeated (NO in step S6).

After determining the correlations R9 regarding all the reference patterns 112 picked up (YES in step S6), the verification determination unit 108 examines the similarity determination results, i.e., the number of times of coincidence of the individual correlations R9 among the predetermined number of reference patterns on the x side and the y side in the input patterns. The verification determination unit 108 compares the number of times of the coincidence with a predetermined threshold and outputs the result as a verification result 109 (step S7).

As a method for determining how many coincidences are established, i.e., for determining the correlations R9 in the similarities S7 of the two input patterns and the reference patterns, there are determined rates indicating how many correlations R9 are matched among a predetermined number of reference patterns 112 on the x side and the y side of the two input patterns while one reference pattern is changed at a time over the predetermined number of reference patterns 112 picked up from the pattern storage unit 101.

At that time, it is possible to perform a determination using, for example, a majority in, for example, a predetermined number of reference patterns 112 picked up as a predetermined threshold.

In face verification as one example, there are extracted respective features, for example, in the input pattern x 110 that is a given face image from a monitoring camera, the input pattern y 111 that is a given face image from an important person list, and the reference pattern 112 picked up from the pattern storage unit 101.

The similarity calculation units 104 and 105 calculate the similarities S7 in the images on the x side and the y side based on these features, and the similarity determination units 106 and 107 determine magnitude relations, i.e., correlations R9 in the calculated similarities on the x side and the y side, respectively.

The feature extraction units 102 and 103, the similarity calculation units 104 and 105, and the similarity determination units 106 and 107 repeat the above processing over a predetermined number of reference patterns 112 picked up from the pattern storage unit 101. The verification determination unit 108 performs verification by determining how many correlations R9 are matched among the predetermined number of reference patterns picked up from the pattern storage unit 101 between the monitoring image side and the important person side and a reference image that is the reference pattern.

Regarding such a determination, when, for example, the respective correlations R9 are matched in, for example, a majority of a predetermined number regarding reference patterns picked up from the pattern storage unit 101, a given face image in a monitoring image and a given face image from an important person list are determined to correspond to the same person.

The above verification result 109 may be presented on a display or the like as described later to an external device or a user using the presentation unit 113 included in the verification determination unit 108, for example. The verification determination unit 108 may present the similarities S7 and the correlations R9 together while being verified at a certain picking-up time. The verification determination unit 108 may issue a notification for alerting the external device or the user using the method as described above.

Figure 4:
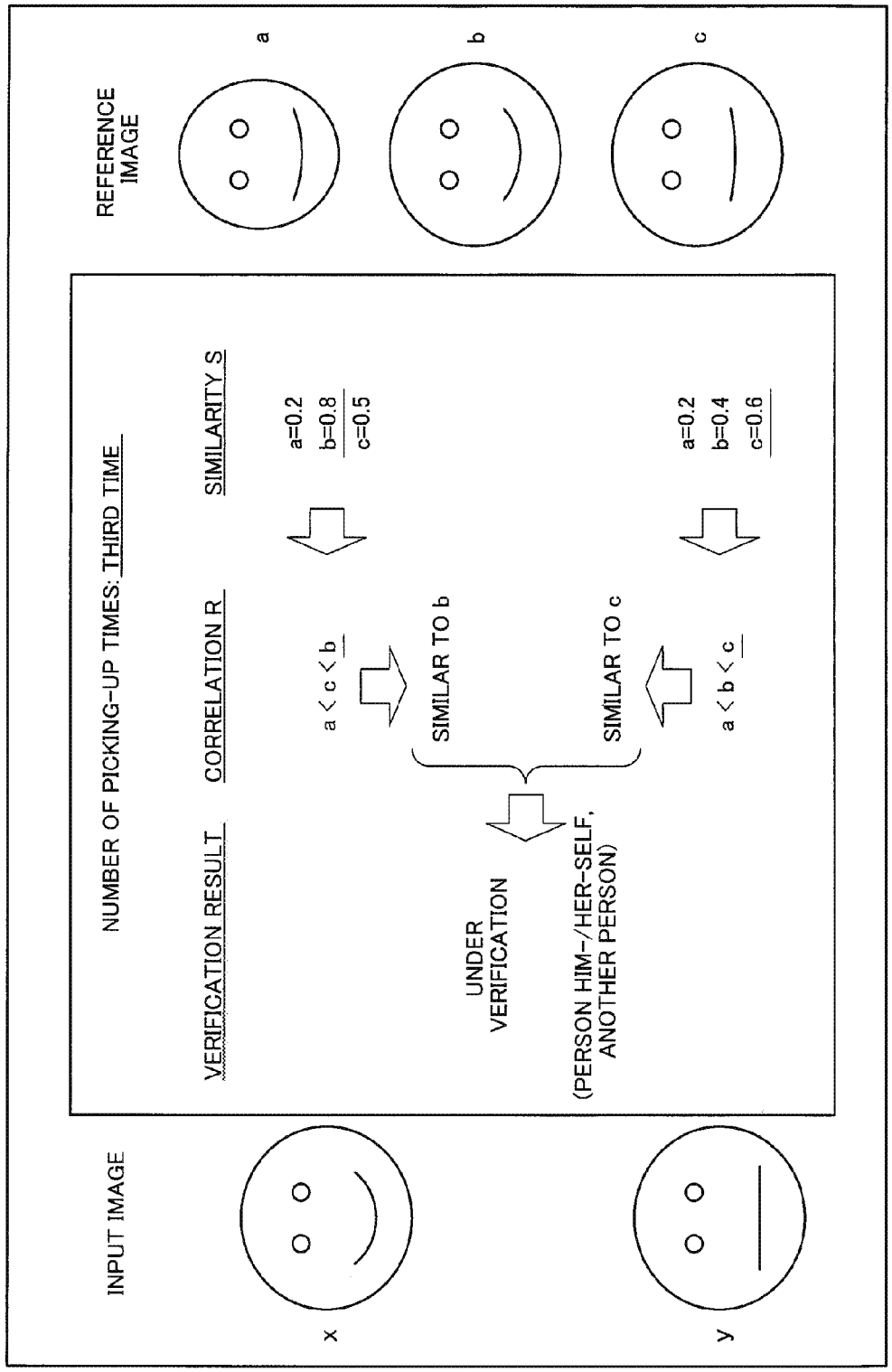
FIG. 4 is a view of an example schematically illustrating a verification status in two input images to be verified in the verification device according to the second exemplary embodiment of the present invention.

As one example, it is possible to collectively present outputs from presentation units (not illustrated) included in the similarity calculation unit 6 and the similarity determination unit 8 and the presentation unit 113 included in the verification determination unit 108 to an external device or a user as illustrated in FIG. 4.

FIG. 4 is a view of an example schematically illustrating a verification status in two input images to be verified. As illustrated in FIG. 4, the similarities S7 and the correlations R9 at a certain picking-up time are calculated or determined and then displayed for input images x and y between these images and three reference images a, b, and c, for example.

The present verification device 100 displays, for example, "another person" or "a person him-/her-self" as a verification result according to numerical values indicated by the final similarities S7 and correlations R9 obtained after repetition of a number of picking-up times determined according to a balance among desired verification accuracy, an upper limit number of reference patterns 112 stored on the pattern storage unit 101, and a processing time for verification.

In FIG. 4, the similarity S7 at a certain picking-up time may not be always a numerical value and may be a figure such as a bar chart, a pie chart, and the like.

In FIG. 4, it is possible to present (display) the correlations R9 at a certain picking-up time together with magnitude relations of the similarities S7 in a plurality of reference images or a number indicating an order of picking up a reference image that is a reference image having the largest similarity S7.

In FIG. 4, a verification result display obtained after repetition of a predetermined number of picking-up times may be performed using an eye-catching color on a large scale so as to be easily visualized by the user or may be performed by blinking or using an animation so that the user is easily alerted.

As described above, a difference between each of a predetermined number of reference patterns 112 picked up from the pattern storage unit 101 and a photographic (acquisition) condition in the input patterns is constant and therefore, a result obtained by comparison among the predetermined number of reference patterns is not affected by a photographic (acquisition) condition in the input patterns.

The present exemplary embodiment is based on the first exemplary embodiment. Therefore, the present exemplary embodiment produces the same effect as the first exemplary embodiment.

In other words, the verification device 100 according to the present exemplary embodiment makes it possible to suppress an erroneous determination upon determining a difference between input patterns based on similarity to a reference pattern recorded under a specific condition. A similarity obtained by calculation can be presented.

In addition to the face verification described above as one example, also in verification in, for example, a fingerprint or an object where images are verified, it is possible to perform verification in the same manner as described above by extracting features thereof.

First Modified Example in the Second Exemplary Embodiment

Next, a first modified example in the second exemplary embodiment based on the first and second exemplary embodiments described above will be described using FIG. 2.

The first modified example in the present exemplary embodiment differs in a respect in which the similarity determination units 106 and 107 each output a rating of the similarities S7 based on a magnitude relation when making an output by determining a magnitude relation of inter-feature similarities S7 between features extracted from the input pattern x 110 and the input pattern y 111 calculated in the similarity calculation units 104 and 105, respectively, and features extracted from the reference pattern 112. Hereinafter, the rating will be referred to as a "ranking."

Therefore, in the following description, characteristic matters according to the first modified example in the present exemplary embodiment will be mainly described and overlapping description of the same configurations as in the first and second exemplary embodiments described above will be omitted by assigning the same reference signs thereto.

In the first modified example in the present exemplary embodiment, when the number of reference patterns 112 picked up at a time is M, information (i.e., the similarity S7) indicating in which one of the reference patterns 112 a similarity is found in one comparison is output.

In other words, upon outputting a ranking, there is output of a vector having a length of M indicating an order (i.e., the correlation R9) when numerical values of the similarities R7 are arranged in descending order. At that time, an output may be made in association with an order upon picking up the reference pattern 112.

The verification determination unit 108 performs a verification determination based on to what extent the rankings of the similarity determination results are matched on the x side and the y side.

Specifically, in the verification determination, it is assumed that when the number of the reference patterns 112 is, for example, three, in a ranking where numerical values of the similarities S7 are arranged in descending order, there are a case where only the first order is matched and a case where all of the three orders are matched. In the verification determination, at that time, when, for example, a threshold is designated as at least two thirds, it is possible that upon coincidence of all of the three orders, the input pattern x 110 and the input pattern y 111 are determined to be matched.

The verification result 109 that is a result of verification determination may be presented on a display or the like as described later to an external device or a user using the presentation unit 113 included in the verification determination unit 108, for example. At that time, using the method as described above, a notification for alerting the external device or the user may be issued.

Specifically, it is possible to collectively present outputs from presentation units (not illustrated) included in the similarity calculation unit 6 and the similarity determination unit 8 and the presentation unit 113 included in the verification determination unit 108 to the external device or the user as illustrated in FIG. 4.

FIG. 4 is a view of an example schematically illustrating a verification status in two input images to be verified and has been described in the second exemplary embodiment and therefore, description in the first modified example will be omitted.

The present exemplary embodiment is based on the first and second exemplary embodiments. Therefore, the present exemplary embodiment produces the same effect as the first and second exemplary embodiments.

In other words, the verification device 100 according to the first modified example in the present exemplary embodiment makes it possible to suppress an erroneous determination upon determining a difference between input patterns based on similarity to a reference pattern recorded under a specific condition.

Second Modified Example in the Second Exemplary Embodiment

Next, a second modified example in the second exemplary embodiment based on the first and second exemplary embodiments will be described using FIG. 2.

In the second modified example of the present exemplary embodiment, for example, using face images as patterns in an example of face verification, there will be more specifically described, using equations, one example of calculation of the similarities S7 between extracted features and similarity determination processing (i.e., processing for calculating the correlations R9) between the calculated similarities R7.

Therefore, in the following description, characteristic matters according to the second modified example in the present exemplary embodiment will be mainly described and overlapping description of the same configurations as in the first and second exemplary embodiments described above will be omitted by assigning the same reference signs thereto.

As described in the second exemplary embodiment, the feature extraction units 102 and 103 respectively extract features from the input pattern x 110 and the input pattern y 111 as well as a predetermined number of reference patterns 112 picked up from the pattern storage unit 101.

In the feature extraction units 102 and 103, it is possible to use a feature vector including arranged filter response results known in, for example, a Sobel filter or a Gabor filter that is feature extraction technology in image processing commonly known nowadays. However, as a method for feature extraction, any method is employable when being capable of calculating the similarity S7 based on extracted features and is not limited to the method described above.

The similarity calculation units 104 and 105 calculate the similarities S7 between the input pattern x 110 and the input pattern y 111 and a predetermined number of reference patterns 112 picked up from the pattern storage unit 101 on the x side and the y side, respectively.

To make description of the second modified example in the present exemplary embodiment easily understood, it is assumed that the number of reference patterns picked up at a time is two and the reference patterns are randomly picked up from the pattern storage unit 101.

Feature vectors in the input pattern x 110 and the input pattern y 111 are designated as x and y, respectively, and feature vectors extracted from two reference patterns 112 picked up from the pattern storage unit 101 are designated as ai and bi.

When on the basis of a Mahalanobis distance, commonly known nowadays as the similarity s, clearly representing a statistical distance relation from a center of gravity in a known sample group with respect to a given sample, a reciprocal of the square of a Mahalanobis distance is used, for example, the similarity s (x,ai) in x and ai can be expressed as the following Math. 1 using a matrix P to be described later.

$$s(x, a_i) = \frac{1}{(x - a_i)P(x - a_i)^T}$$ Math. 1

In other words, as two input patterns are similar, the Mahalanobis distance becomes small and the similarity s defined above increases.

The superscript T represents transpose. The matrix P previously prepared refers to a positive semi-definite matrix (i.e., a matrix expressed as P=(transpose of A)×A using a certain matrix A). Any method is employable when being capable of determining the similarity s based on feature vectors and is not limited to the method described above.

The similarity calculation unit 104 calculates s(x,ai) and s(x,bi) and in the same manner, the similarity calculation unit 105 calculates s(y,ai) and s(y,bi) to output the calculated similarities s to the similarity determination units 106 and 107, respectively.

The similarity determination units 106 and 107 determine the correlations R9 that are magnitude relations in the similarities indicating to which one of the reference patterns 112 the similarities s calculated in the similarity calculation units 104 and 105 exhibit further similarity, respectively.

Specifically, for example, the similarity determination unit 106 compares the similarity s(x,ai) and the similarity s (x,bi) between the input pattern x 110 and the reference patterns ai and bi and determines similarity to a reference pattern having a larger similarity. As the determination result, for example, a larger similarity s is output in association with a reference pattern or orders representing the similarities s are output in descending order in association with a reference pattern. However, an output method of the determination result from each of the similarity determination units 106 and 107 is not limited to the method described above.

When being designated as ri (i.e., able to be referred to also as a correlation r), the similarity determination result can be expressed by the following Math. 2.

$$r_i(x) = \begin{cases} a_i & \text{if } s(x, a_i) > s(x, b_i) \\ b_i & \text{otherwise} \end{cases}$$ Math. 2

The reference patterns (ai and bi) picked up from the pattern storage unit 101 are reference patterns photographed under a specific photographic condition and therefore, a differences in photographic condition between these reference patterns (ai and bi) and the input pattern x 110 is constant.

Therefore, the similarity determination result ri(x), i.e., a magnitude relation of the similarities in s(x,ai) and s(x,bi) is independent of a photographic condition in the input pattern.

When the above operation is executed N times while the reference patterns (ai and bi) are changed, a similarity determination result {ri(x)} (i=1, . . . , N) is obtained. N represents the number of combinations upon picking up a predetermined number of reference patterns stored on the pattern storage unit 101.

In this manner, the similarity determination unit 107 also performs the same operation for the input pattern y 111 to obtain a similarity determination result {ri(y)} (i=1, . . . , N).

The verification determination unit 108 performs a verification determination between the input patterns x and y based on to what extent the similarity determination results {ri(x)} and {ri(y)} are matched.

For the matter to what extent the similarity determination results are matched, a predetermined threshold θ to be described later is provided.

In other words, the threshold is one for determining how many coincidences are established with respect to a predetermined number of reference patterns 112 picked up. For example, a majority of a predetermined number that is the number of reference patterns picked up from the pattern storage unit 101 is settable. However, the predetermined threshold is not limited to a majority among a predetermined number of reference patterns picked up.

Assuming that when a verification determination is performed, for example, using a rate where similarity determination results are matched, a verification determination result z is represented by the following Math. 3.

$$z(x, y) = \begin{cases} 1 & \text{if } \frac{1}{N}\sum_{i=1}^{N} 1(r_i(x) = r_i(y)) > \theta \\ 0 & \text{otherwise} \end{cases}$$ Math. 3

In Math. 3, 1(ri(x)=ri(y)) is a function outputting 1 or 0 when (ri(x)=ri(y)) is true or false, respectively, and θ represents a predetermined threshold.

As the verification determination result z(x,y), when on the basis of the threshold θ, the input pattern x 110 and the input pattern y 111 are determined to be the same or different, 1 or 0 is output, respectively. In other words, when sorting the similarity determination result ri based on the predetermined threshold θ, the verification device 100 according to the second modified example in the present exemplary embodiment can determine a difference between two input patterns and perform verification.

At that time, the presentation unit 113 included in the verification determination unit 108 may present the similarities s, the correlations r, and a verification status such that the verification result 109 is illustrated in FIG. 4 to an external device or a user using a display or the like to be described later.

FIG. 4 is a view of an example schematically illustrating a verification status in two input images to be verified and has been described in the second exemplary embodiment and therefore, description in the second modified example will be omitted.

In the verification device 100 according to the second modified example in the present exemplary embodiment, a difference between each of a predetermined number of reference patterns (ai and bi) picked up from the pattern storage unit 101 photographed under a specific photographic condition and input patterns is constant in photographic condition and therefore, a result obtained by comparison between the predetermined number of reference patterns (ai and bi) is not affected by a photographic condition in the input patterns.

In other words, a magnitude relation of the similarities in the similarity determination result ri(x), i.e., s(x,ai) and s(x,bi) are independent of the photographic condition of the input pattern. This is the same as in ri(y).

The present exemplary embodiment is based on the first and second exemplary embodiments. Therefore, the present exemplary embodiment produces the same effect as the first and second exemplary embodiments.

In other words, the verification device 100 according to the second modified example in the present exemplary embodiment makes it possible to suppress an erroneous determination upon determining a difference between input patterns based on similarity to a reference pattern recorded under a specific condition.

Third Modified Example of the Second Exemplary Embodiment

Next, a third modified example in the second exemplary embodiment based on the first and second exemplary embodiments will be described using FIG. 2.

In the present exemplary embodiment, one example where rankings of the reference patterns 112 based on the similarities s in the similarity determination units 106 and 107 determined in the first modified example in the second exemplary embodiment are applied to verification determination as a similarity determination result will be specifically described using equations.

Therefore, in the following description, characteristic matters according to the third modified example in the present exemplary embodiment will be mainly described and overlapping description of the same configurations as in the first and second exemplary embodiments described above will be omitted by assigning the same reference signs thereto.

In the verification device 100 according to the third modified example in the present exemplary embodiment, for description convenience, the number of reference patterns picked up from the pattern storage unit 101 at a time is assumed to be three that are designated as ai, bi, and ci each.

The similarity calculation units 104 and 105 calculate the similarities s between the two input patterns x 110 and y 111 and the three reference patterns ai, bi, and ci in the same manner as described in the second exemplary embodiment. On the basis of these similarities s, the similarity determination units 106 and 107 compare a magnitude relation in the similarities to generate a ranking in the reference patterns picked up.

It is assumed that, for example, as the similarities s between the input pattern x 110 and the reference patterns ai, bi, and ci, Math. 4 is obtained.

$$s(x,a_i)=0.2, s(x,b_i)=0.7, s(x,c_i)=0.4 \qquad \text{Math. 4}$$

In the Math., the orders from the highest in the similarities s are as follows: a second reference pattern ranks first, a third reference pattern ranks second, and a first reference pattern ranks third, and therefore, as a generated ranking ri (x), Math. 5 is obtained by arranging these orders.

$$r_i(x)=(3,1,2) \qquad \text{Math. 5}$$

In other words, the similarity determination units 106 and 107 outputs a similarity determination result where an order for comparing, one by one, the reference patterns picked up at a time and an order (i.e., a similarity degree) having a higher similarity s are correlated with each other to the verification determination unit 108.

The verification determination unit 108 performs a verification determination between the input pattern x and the input pattern y using the predetermined threshold θ based on to what extent the similarity determination results {ri(x)} and {ri(y)} are matched.

Assuming that when as a coincidence degree of rankings, for example, a Spearman's rank correlation coefficient is used, a verification determination result z can be expressed as follows.

$$z(x, y) = \begin{cases} 1 & \text{if } \sum_{i=1}^{N} \frac{6\|r_i(x) - r_i(y)\|^2}{M^3 - M} > \theta \\ 0 & \text{otherwise} \end{cases} \qquad \text{Math. 6}$$

In Math. 6, M represents a ranking length (i.e., in the present exemplary embodiment, M=3) and θ represents a predetermined threshold.

When the verification determination unit 108 determines the above correlation r (i.e., a ranking of similarities s) using a predetermined threshold while all the reference patterns (ai, bi, and ci) are changed, the verification device 100 according to the third modified example of the present exemplary embodiment can determine an input pattern most similar to a reference pattern.

Assuming that when, for example, θ=0.6 and of respective three orders in {ri(x)} and {ri(y)}, for example, the top two orders are matched, two input patterns are conceivable to be matched.

At that time, the presentation unit 113 included in the verification determination unit 108 may present the similarities s, the correlations r, and a verification status such that the verification result 109 is illustrated in FIG. 4 to an external device or a user using a display or the like to be described later.

FIG. 4 is a view of an example schematically illustrating a verification status in two input images to be verified and has been described in the second exemplary embodiment and therefore, description in the third modified example will be omitted.

A method for determining a coincidence degree in two input patterns upon performing a verification determination is not limited to the above method.

In the verification device 100 according to the third modified example in the present exemplary embodiment, a difference between each of a predetermined number of reference patterns (ai, bi, and ci) picked up from the pattern storage unit 101 photographed under a specific photographic condition and input patterns is constant in photographic condition and therefore, a result obtained by comparison between the predetermined number of reference patterns (ai, bi, and ci) is not affected by a photographic condition in the input patterns.

In other words, a magnitude relation of the similarities in the similarity determination result ri(x), i.e., s(x,ai), s(x,bi), and s(x,ci) is independent of the photographic condition of the input pattern. This is the same as in ri(y).

The present exemplary embodiment is based on the first and second exemplary embodiments. Therefore, the present exemplary embodiment produces the same effect as the first and second exemplary embodiments.

In other words, the verification device 100 according to the third modified example in the present exemplary embodiment makes it possible to suppress an erroneous determination upon determining a difference between input patterns based on similarity to a reference pattern recorded under a specific condition.

Third Exemplary Embodiment

Next, a third exemplary embodiment based on the first and second exemplary embodiments will be described.

The third exemplary embodiment is different in a respect in which the block diagram representing the functions illustrated in FIG. 2 and the flowchart representing the control illustrated in FIG. 3 are achieved by a general-purpose information processing device.

Therefore, in the following description, characteristic matters according to the present exemplary embodiment will be mainly described and overlapping description of the same configurations as in the first and second exemplary embodiments described above will be omitted by assigning the same reference signs thereto.

Figure 5:
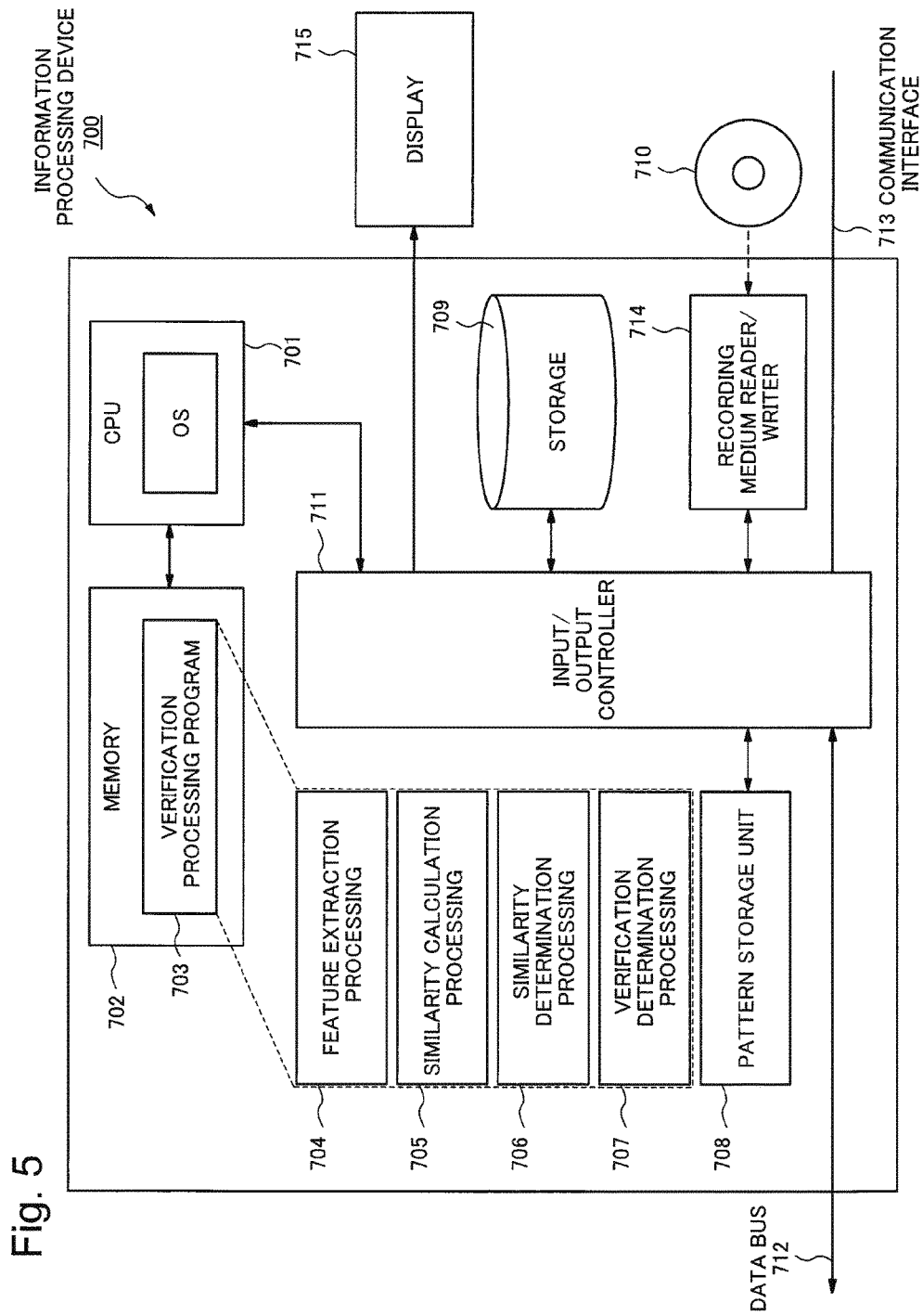
FIG. 5 is a block diagram conceptually illustrating processing upon achieving a control method for a verification device according to a third exemplary embodiment of the present invention using a computer program.
Figure 6:
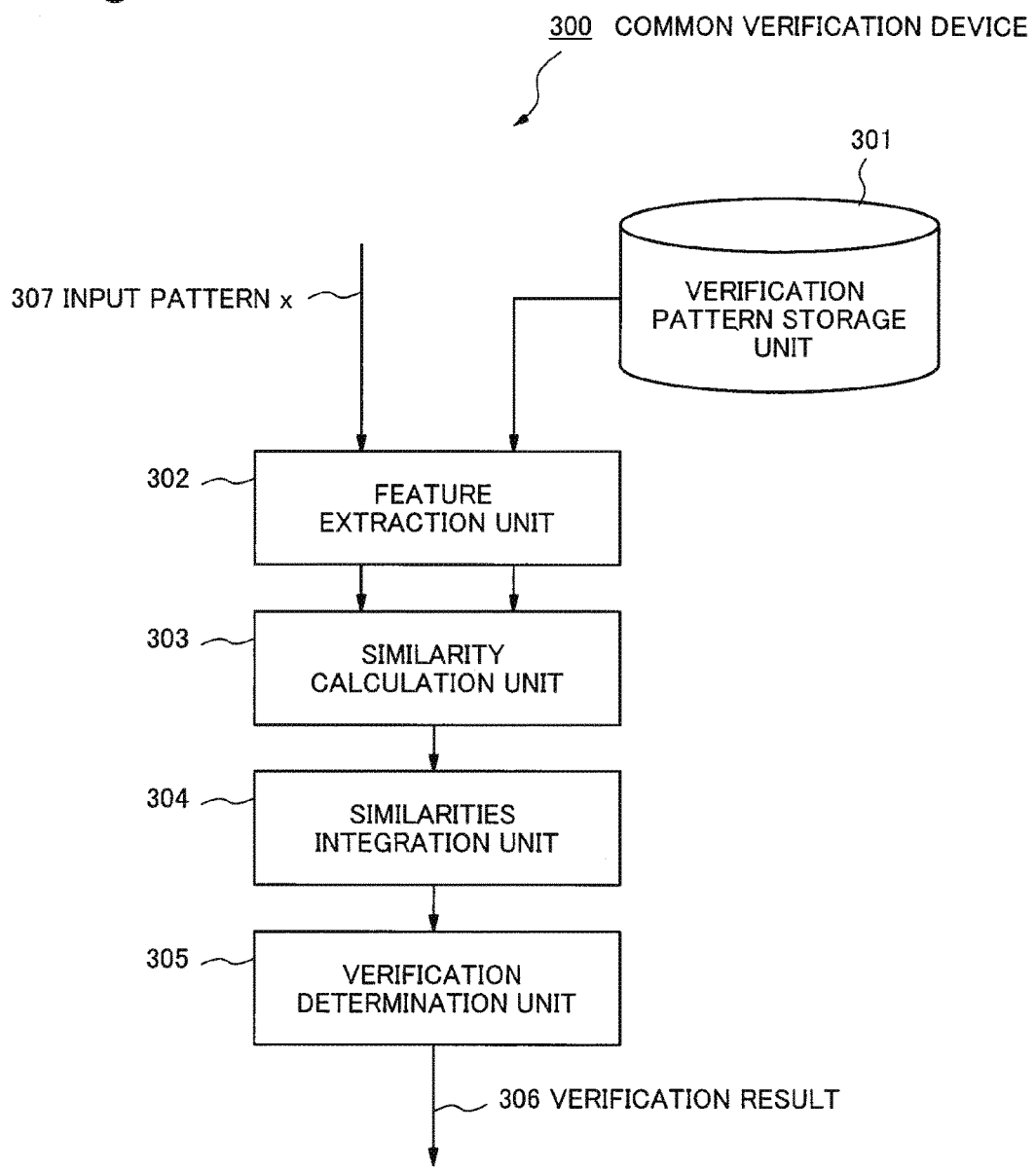
FIG. 6 is a block diagram illustrating a function in a common verification device using a Z-norm method.
Figure 7:
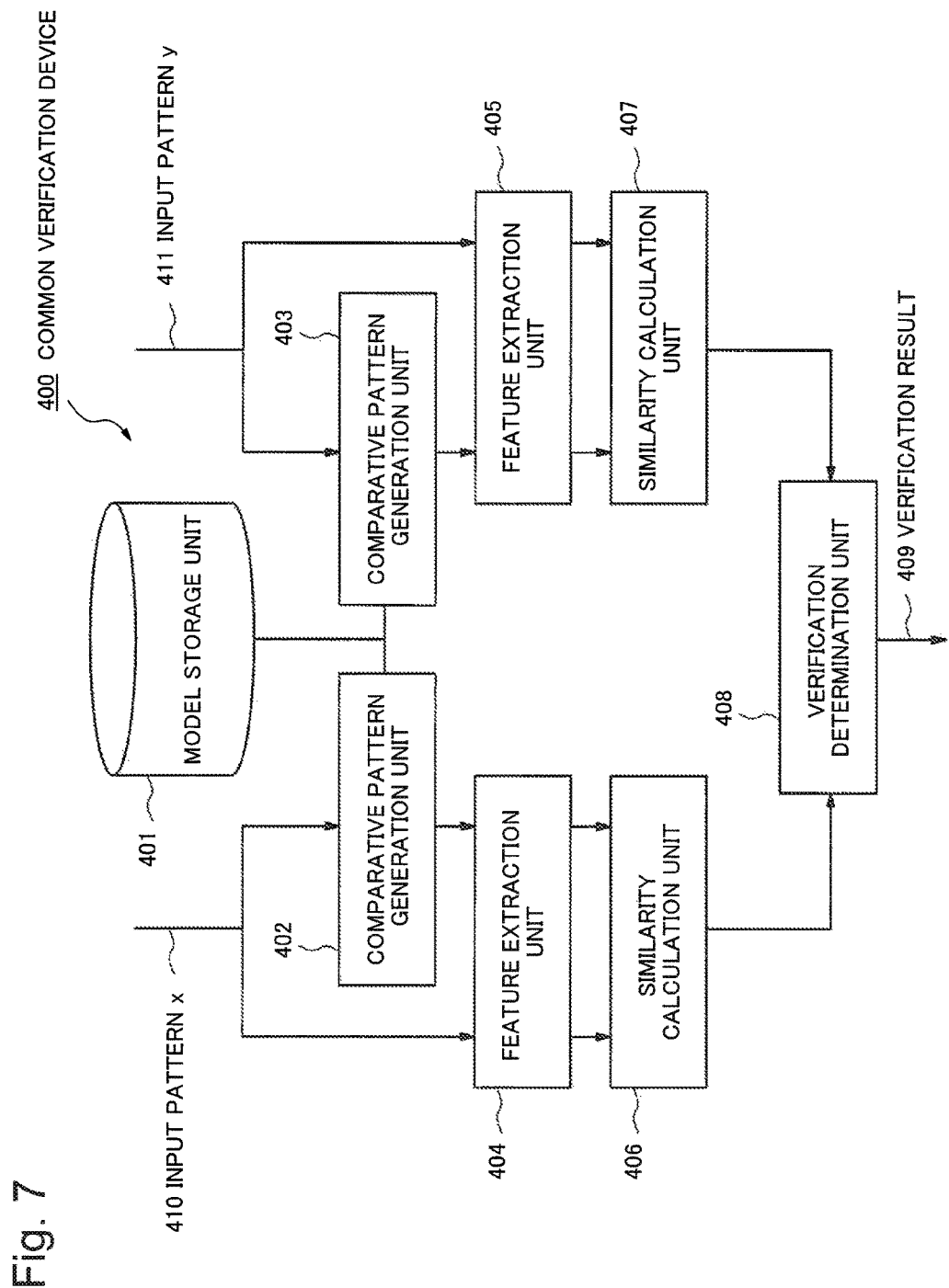
FIG. 7 is a block diagram illustrating a function in a common verification device using a comparative pattern generation unit.

The third exemplary embodiment will described using FIG. 5. FIG. 5 is a block diagram conceptually illustrating a hardware configuration upon achieving a control method in an information processing device 700 using a computer program.

The information processing device 700 includes a Central Processing Unit (hereinafter, abbreviated to as a "CPU") 701, a memory 702, a verification processing program 703, a pattern storage unit 708, a storage 709, a recording medium reader/writer 714, an input/output controller 711, and a display 715.

The present information processing device 700 includes a data bus 712 and a communication interface 713. In the present information processing device 700, a computer-readable recording medium 710 capable of transferring data via the recording medium reader/writer 714 is insertable and withdrawable.

In the present exemplary embodiment, the information processing device 700 achieves each function in the block diagram illustrated in FIG. 2 and each processing in the flowchart illustrated in FIG. 3, in cooperation with the CPU 701 included in the information processing device 700 illustrated in FIG. 5 and an Operating System (hereinafter, abbreviated as an "OS") that is software operating in the CPU 701 as well as the verification processing program 703 that is a computer program deployed on the memory 702.

The information processing device 700 illustrated in FIG. 5 includes the CPU 701 controlling programs, the OS operating in cooperation in the CPU 701, and the memory 702 where programs operating in cooperation therewith are deployed.

The information processing device 700 includes the pattern storage unit 708 previously storing a plurality of reference patterns photographed under a specific photographic condition. The pattern storage unit 708 may store these reference patterns on the storage 709 that is a readable/writable, non-volatile storage medium.

The pattern storage unit 708 may store a plurality of reference patterns 112 using a high-speed memory. Storage contents of the pattern storage unit 708 may be stored on the memory 702 together with the verification processing program 703 in order to operate at higher speed.

The information processing device 700 includes the recording medium reader/writer 714 reading/writing files and data of programs, patterns, and the like for the verification processing program 703 and the pattern storage unit 708 from the outside, the input/output controller 711 controlling an input/output of various types of input/output data included in the information processing device 700 via control executed by the OS cooperating with the CPU 701, the data bus 712 performing data exchanges with an external device (not illustrated, hereinafter the same), and the communication interface 713 performing data communications with the external device in the same manner.

The verification processing program 703 in the information processing device 700 includes feature extraction processing 704, similarity calculation processing 705, similarity determination processing 706, and verification determination processing 707 as processing functions.

The respective processings in the feature extraction processing 704, the similarity calculation processing 705, the similarity determination processing 706, and the verification determination processing 707 in verification processing program 703 correspond to the respective units in the first and second exemplary embodiments, and since these operations have been described, specific description thereof in the present exemplary embodiment will be omitted.

It is possible to present, to a user, for example, the similarities S7 at a certain picking-up time, the correlations R9 (i.e., a verification status), and the final verification result 109 in the similarity calculation processing 705, the similarity determination processing 706, and the verification determination processing 707 by displaying, for example, the display of the verification status as illustrated in FIG. 4 on the display 715.

The pattern storage unit 708 may use a verification device where a function only for performing an operation for storing a plurality of reference patterns is previously separated in a location having a specific photographic environment. In this case, a verification device achieving the remaining processing functions is placed in a different location and these devices are caused to cooperate with each other, for example, via a communication network.

The information processing device 700 according to the present exemplary embodiment is supplied with a computer program as the verification processing program 703 capable of achieving the respective blocks in the above verification device (FIG. 2) and the functions (processings) illustrated in the flowchart (FIG. 3) illustrating the control.

The CPU 701 where the computer program is prepared as a verification processing method performed by the present information processing device 700 and the cooperating OS as well as execution of the verification processing program 703 by being read on the memory 702 achieve operations of the verification devices (1 and 100) described in the first and second exemplary embodiments, respectively.

As a supply method of the computer program to the information processing device 700, employable are the following currently common ways including:
a method for an install in the information processing device 700 using the recording medium reader/writer 714 via various types of recording media 710 including
  a Floppy (a registered trademark) disk,
  disc media such as a CD-ROM (Compact Disc Read Only Memory), and the like, and
  memory media such as a Universal Serial Bus (hereinafter abbreviated as "USB") memory, and the like; and
a method for a download and install
  from an external device via the data bus 712 or
  from an external device using the communication interface 713 via a wireless or cable communication line such as the Internet.

In such cases, it is conceivable that the present exemplary embodiment includes codes configuring such a computer program or a computer-readable recording medium stored with such codes.

Such a verification device using the general-purpose information processing device 700 may be achieved as a dedicated device.

The present exemplary embodiment is based on the first and second exemplary embodiments. Therefore, the present exemplary embodiment produces the same effect as the first and second exemplary embodiments.

In other words, the information processing device 700 according to the present exemplary embodiment makes it possible to suppress an erroneous determination upon determining a difference between input patterns based on similarity to a reference pattern recorded under a specific condition.

Fourth Exemplary Embodiment

Next, a fourth exemplary embodiment based on the first to third exemplary embodiments will be described.

The fourth exemplary embodiment is different in a respect in which processings of the respective units in the second exemplary embodiment illustrated in FIG. 2 are achieved by information processing devices different from each other and thereby, verifications can be performed in different locations. In other words, the processings of the units includes:
  storing a plurality of reference patterns 112 on the pattern storage unit,
  inputting two input patterns,
  feature extraction in the feature extraction units 102 and 103,
  similarity calculation in the similarity calculation units 104 and 105, and
  similarity determination in the similarity determination units 106 and 107 and verification determination in the verification determination unit 108.

Therefore, in the following description, characteristic matters according to the present exemplary embodiment will be mainly described and overlapping description of the same configurations as in the first to third exemplary embodiments described above will be omitted by assigning the same reference signs thereto.

In other words, it is possible to construct and operate a verification processing system, in which in the control method in the information processing device 700 according to the third exemplary embodiment described using FIG. 5, respective processings in the information processing device 700 that is a general-purpose information processing device are achieved individually and the various types of processings are executed in different locations by being connected communicably with each other via a communication network, and thereby verification processing becomes executable as a whole of these.

The respective processings more specifically include the feature extraction processing 704, the similarity calculation processing 705, the similarity determination processing 706, the verification determination processing 707, and reference pattern storage processing in the pattern storage unit 708.

As one example, a plurality of reference patterns 112 are previously photographed in a location having a specific photographic condition and stored on the pattern storage unit 708, for example, in a first information processing device that is not illustrated. Upon executing verification processing, it is possible to perform transmission from the first information processing device stored with the reference patterns 112, for example, to a second information processing device, not illustrated, for performing verification including the following similarity calculation, similarity determination, and verification determination via the data bus 712 or the communication network 713.

The first information processing device is disposed in a specific photographing location as a verification device executing only processing of step S1 in the flowchart representing the control method of the verification device illustrated in FIG. 3, i.e., processing of the pattern storage unit 708 for storing a reference pattern.

Upon, for example, face verification, it is possible that the input pattern x 110 is acquired as a monitoring image in a vicinity of a location where a camera is disposed and thereafter, the above verification determination processing is executed.

At that time, it is possible to provide an information processing device executing the verification determination processing as a verification device in the vicinity of the location where a camera is disposed, for example.

It is possible to acquire, for example, a monitoring image (an input pattern x) from a camera and a specific person image (an input pattern y), for example, from the data bus 712.

To safely executing processing for pattern data stored on the pattern storage unit 708, the verification processing program 703, and data processed in the verification processing program 703, verification may be performed in a different location where safety is ensured.

It is also possible to grasp a verification status from a remote location by displaying the verification status as illustrated in FIG. 4 on the display 715.

As described above, it is possible to distribute installation locations of the information processing devices 700 achieved by general-purpose information processing devices by separating individual processing functions according to convenience in a pattern input, a location for verification processing, and the like, by being connected communicably with each other via a communication network. This is conceivable as a verification processing system.

Operations of the respective processing functions in the information processing device 700 have been described in the first to third exemplary embodiments and therefore, specific description thereof in the present exemplary embodiment will be omitted.

The present exemplary embodiment is based on the first to third exemplary embodiments. Therefore, the present exemplary embodiment produces the same effect as the first to third exemplary embodiments.

In other words, the information processing device 700 according to the present exemplary embodiment makes it possible to suppress an erroneous determination upon determining a difference between input patterns based on similarity to a reference pattern recorded under a specific condition.

A part or all of the respective exemplary embodiments and the modified examples thereof can be described also as the following supplementary notes. However, the present invention having been illustratively described using the exemplary embodiments and the modified examples is not limited to the following description, i.e., (Supplementary Note 1)

A verification device including a similarity calculation unit that calculates similarities between a set of input information indicating features related to input patterns that are objects of verification and a plurality of types of reference information indicating features related to a reference pattern to be a reference of the verification using the set of input information and the plurality of types of reference information.

(Supplementary Note 2)

The verification device according to Supplementary Note 1, wherein the similarity calculation unit presents a plurality of the calculated similarities to a user.

(Supplementary Note 3)

The verification device according to Supplementary Note 1 further including a similarity determination unit that determines correlations between the pluralities of the calculated similarities.

(Supplementary Note 4)

The verification device according to Supplementary Note 1, wherein for the similarities, a plurality of information representing similarity degrees calculated based on a calculated value statistically determined between the set of input information and the plurality of types of reference information are used.

(Supplementary Note 5)

The verification device according to Supplementary Note 1, wherein the similarities have a feature that each similarity to the same reference information among the plurality of reference information with respect to the input information in the set of input information is determined while the same reference information being changed over the plurality of reference information, and the determined similarity is correlated with the input information and the reference information.

(Supplementary Note 6)

The verification device according to Supplementary Note 3, wherein the correlations have a feature that relations between the similarities are arranged in association with an order upon being changed over the plurality of reference information based on a magnitude relation in the similarities or an information having a largest value in the similarities is correlated with an order upon being changed over the plurality of reference information.

(Supplementary Note 7)

The verification device according to Supplementary Note 3 further including a verification determination unit that determines differences between a set of input feature information that are the input information based on the determined correlations and presents a verification result in the determination to a user.

(Supplementary Note 8)

The verification device according to Supplementary Note 7, wherein when rates indicating how many of a plurality of reference feature information that are the plurality of reference information are matched in the set of input feature information in the correlations are determined based on a predetermined threshold, the verification determination unit sets at least a majority of the plurality of reference feature information as the threshold.

(Supplementary Note 9)

The verification device according to any one of Supplementary Note 1 to Supplementary Note 8, wherein the input patterns that are the objects of verification and the reference pattern to be the reference of the verification are images.

(Supplementary Note 10)

The verification device according to Supplementary Note 8, wherein the verification determination unit further includes a presentation unit upon presenting the verification result to a user and presents a verification result indicating the same image using the presentation unit upon having determined that the correlations in the similarities between a set of input images that are the input patterns and a plurality of reference images that are the plurality of reference patterns indicate the same image by exceeding the predetermined threshold.

(Supplementary Note 11)

The verification device according to Supplementary Note 10, wherein upon having determined that the correlations in the similarities between the set of input images that are the input patterns and the plurality of reference images indicate the same image by exceeding the predetermined threshold, the verification determination unit issues a notification by any one of changing a display of the displayed verification result reporting a verification result indicating the same image, generating a sound, generating a voice, lighting or blinking a light, generating a vibration sensible to a user, and issuing a notification to another information processing device via a communicable communication network, or by a combination thereof.

(Supplementary Note 12)

The verification device according to any one of Supplementary Note 9 to Supplementary Note 11, wherein the reference feature information are obtained by previously photographing the plurality of reference images under a specific photographic condition and also features of the images are extracted to be stored on a feature storage unit.

(Supplementary Note 13)

A control method for a verification device, the method calculating similarities between a set of input information indicating features related to input patterns that are objects of verification and a plurality of types of reference information indicating features related to a reference pattern to be a reference of the verification using the set of input information and the plurality of types of reference information.

(Supplementary Note 14)

The control method for the verification device according to Supplementary Note 13, wherein a plurality of the calculated similarities are presented to a user.

(Supplementary Note 15)

The control method for the verification device according to Supplementary Note 13, wherein a similarity determination function determines correlations between the plurality of the calculated similarities.

(Supplementary Note 16)

The control method for the verification device according to Supplementary Note 13, wherein each similarity to the same reference information among the plurality of reference information with respect to the input information in the set of input information is determined while the same reference information being changed over the plurality of reference information, and the determined similarity is correlated with the input information and the reference information.

(Supplementary Note 17)

The control method for the verification device according to Supplementary Note 13, wherein relations between the similarities are arranged in association with an order upon being changed over the plurality of reference information based on a magnitude relation in the similarities or an information having a largest value in the similarities is correlated with an order upon being changed over the plurality of reference information.

(Supplementary Note 18)

A computer program causing a computer to calculate similarities between a set of input information indicating features related to input patterns that are objects of verification and a plurality of types of reference information indicating features related to a reference pattern to be a reference of the verification using the set of input information and the plurality of types of reference information.

(Supplementary Note 19)

The computer program according to Supplementary Note 18 causing a computer to present a plurality of the calculated similarities to a user.

(Supplementary Note 20)

The computer program according to Supplementary Note 18 causing a computer to determine correlations between the plurality of the calculated similarities.

(Supplementary Note 21)

A verification system device including an information processing device that calculates similarities between a set of input information indicating features related to input patterns that are objects of verification and a plurality of types of reference information indicating features related to a reference pattern to be a reference of the verification using the set of input information and the plurality of types of reference information, the information processing device being communicably connected via a communication network to any one of a pattern storage function storing the reference pattern, a feature extraction function extracting features related to the input patterns and the reference pattern, a similarity calculation function calculating similarities between the extracted features, a similarity determination function determining correlations between the calculated similarities, and a verification determination function verifying the determined correlations.

The present invention has been described using the exemplary embodiments as typical examples. However, the present invention is not limited to the exemplary embodiments. In other words, in the scope of the present invention, the present invention is applicable to various aspects understandable to those skilled in the art.

This application claims priority based on Japanese Patent Application No. 2012-160418, filed on Jul. 19, 2012, the entire disclosure of which is incorporated by reference herein.

INDUSTRIAL APPLICABILITY

The present invention is not limited to the exemplary embodiments and applicable to, for example, a verification device and the like for verifying biological information in face verification and the like or for recognizing an object to identify the object.

REFERENCE SIGNS LIST

1 Verification device
2 Feature storage unit
6 Similarity calculation unit
7 Similarity S
8 Similarity determination unit
9 Correlation R
10 Input information x
11 Input information y
12 Reference information
100 Verification device
101 Pattern storage unit
102 Feature extraction unit
103 Feature extraction unit
104 Similarity calculation unit
105 Similarity calculation unit
106 Similarity determination unit
107 Similarity determination unit
108 Verification determination unit
109 Verification result
110 Input pattern x
111 Input pattern y
112 Reference pattern
113 Presentation unit
200 Common verification device
201 Feature extraction unit
202 Feature extraction unit
203 Similarity calculation unit
204 Verification determination unit
205 Verification result
206 Input pattern x
207 Input pattern y
300 Common verification device
301 Verification pattern storage unit
302 Feature extraction unit
303 Similarity calculation unit
304 Similarities integration unit
305 Verification determination unit
306 Verification result
307 Input pattern x
400 Common verification device
401 Model storage unit
402 Comparative pattern generation unit
403 Comparative pattern generation unit
404 Feature extraction unit
405 Feature extraction unit
406 Similarity calculation unit
407 Similarity calculation unit
408 Verification determination unit
409 Verification result
410 Input pattern x
411 Input pattern y
700 Information processing device
701 CPU
702 Memory
703 Verification processing program
704 Feature extraction processing
705 Similarity calculation processing 706 Similarity determination processing
707 Verification determination processing
708 Pattern storage unit
709 Storage
710 Recording medium
711 Input/output controller
712 Data bus
713 Communication interface
714 Recording medium reader/writer
715 Display

What is claimed is:

1. An information processing device comprising:
   a processor; and
   a memory storing instructions to be executed by the processor by causing the processor to execute:
   a similarity calculation unit configured to calculate first similarities between one input information included in a set of input information indicating features related to input patterns that are objects of a verification and each of a plurality of types of reference information indicating features related to reference patterns that are acquired in a specific condition as references of the verification and to calculate second similarities between another input information included in the set of input information indicating features related to input patterns that are objects of the verification and each of the plurality of types of reference information indicating features related to reference patterns that are acquired in the specific condition as references of the verification; and
   a similarity determination unit configured to determine first correlations between the pluralities of first similarities relating to one input information and to determine second correlations between the pluralities of second similarities relating to another input information; and
   a verification determination unit configured to (i) compare determined first correlations and second correlations, (ii) output a result obtained by examining a rate how the first correlations and second correlations are matched, (iii) compare the rate of the result with a predetermined threshold, (iv) determine whether or not each of the set of the input information represents a same image on the basis of the comparison result, and (v) present a verification result as to the determination.

2. The information processing device according to claim 1, wherein the similarity calculation unit presents a plurality of the calculated first similarities and the plurality of the calculated second similarities.

3. The information processing device according to claim 1, wherein for first similarities and second similarities, a plurality of information representing similarity degrees calculated based on a calculated value statistically determined between the set of input information and the plurality of types of reference information are used.

4. The information processing device according to claim 1, wherein first similarities and second similarities have a feature that each similarity to the same reference information among the plurality of reference information with respect to the input information in the set of input information is determined while the same reference information being changed over the plurality of reference information, and the determined similarity is correlated with the input information and the reference information.

5. The information processing device according to claim 1, wherein first correlations and second correlations have a feature that relations between the similarities are arranged in association with an order upon being changed over the plurality of reference information based on a magnitude relation in the similarities or an information having a largest value in the similarities is correlated with an order upon being changed over the plurality of reference information.

6. The information processing device according to claim 1, wherein the verification determination unit further comprises a presentation unit upon presenting the verification result and presents a verification result indicating the same image using the presentation unit upon having determined that first correlations and second correlations in the similarities between a set of input images that are the input patterns and a plurality of reference images that are the plurality of reference patterns indicate the same image by exceeding the predetermined threshold.

7. A control method for a verification device, the method comprising:
   calculating first similarities between one input information included in a set of input information indicating features related to
   input patterns that are objects of a verification and each of a plurality of types of reference information indicating features related to reference patterns that are acquired in a specific condition as references of the verification and calculating second similarities between another input information included in the set of input information indicating features related to input patterns that are objects of the verification and each of the plurality of types of reference information indicating features related to reference patterns that are acquired in the specific condition as references of the verification;
   determining first correlations between the pluralities of first similarities relating to one input information and determining second correlations between the pluralities of second similarities relating to another input information;
   comparing determined first correlations and second correlations;
   outputting a result obtained by examining a rate how first correlations and second correlations are matched;
   comparing the rate of the result with a predetermined threshold;
   determining whether or not each of the set of the input information represents a same image on the basis of the comparison result; and
   presenting a verification result as to the determination.

8. A non-transitory computer readable medium storing a computer program causing a computer to:
   calculate first similarities between one input information included in a set of input information indicating features related to
   input patterns that are objects of a verification and each of a plurality of types of reference information indicating features related to reference patterns that are acquired in a specific condition as references of the verification and calculate second similarities between another input information included in the set of input information indicating features related to input patterns that are objects of the verification and each of the plurality of types of reference information indicating features related to reference patterns that are acquired in the specific condition as references of the verification and determine first correlations between the pluralities of first similarities relating to one input information and determine second correlations between the pluralities of second similarities relating to another input information;

compare determined first correlations and second correlations;

output a result obtained by examining a rate how first correlations and second correlations are matched;

compare the rate of the result with a predetermined threshold;

determine whether or not each of the set of the input information represents a same image on the basis of the comparison result; and present a verification result as to the determination.

* * * * *